(12) United States Patent
Murakami et al.

(10) Patent No.: US 6,559,834 B1
(45) Date of Patent: May 6, 2003

(54) GLARE-RESISTANT TOUCH PANEL

(75) Inventors: Yukio Murakami, Kameoka (JP); Shunsuke Hirano, Kameoka (JP); Keiichi Minakuchi, Toyonaka (JP)

(73) Assignees: Gunze Limited, Kyoto (JP); Sumitomo Chemical Company, Ltd., Osaka (JP)

( * ) Notice: Subject to any disclaimer, the term of this patent is extended or adjusted under 35 U.S.C. 154(b) by 288 days.

(21) Appl. No.: 09/654,285

(22) Filed: Sep. 1, 2000

(30) Foreign Application Priority Data

Sep. 3, 1999 (JP) .......................... 11-250594
Mar. 1, 2000 (JP) ....................... 2000-056424

(51) Int. Cl.⁷ ................................. G09G 5/10
(52) U.S. Cl. ................ 345/173; 178/18.01; 178/18.03; 178/18.05; 178/18.06; 178/18.07; 349/56; 349/60
(58) Field of Search ............... 178/18.01, 18.03, 178/18.05, 18.06, 18.07; 345/173; 349/60, 56

(56) References Cited

U.S. PATENT DOCUMENTS

| | | | | |
|---|---|---|---|---|
| 4,893,115 A | * | 1/1990 | Blanchard | 341/22 |
| 4,958,148 A | * | 9/1990 | Olson | 178/18.01 |
| 5,149,918 A | * | 9/1992 | Kozik et al. | 178/18.05 |
| 6,020,408 A | * | 2/2000 | Suzuki et al. | 428/447 |
| 6,020,945 A | | 2/2000 | Sawai et al. | |
| 6,067,133 A | * | 5/2000 | Niibori et al. | 349/150 |
| 6,307,166 B1 | * | 10/2001 | Watanabe et al. | 178/18.03 |
| 6,424,339 B1 | * | 7/2002 | Randall | 178/18.01 |
| 2001/0037738 A1 | * | 11/2001 | Kioshita | |

FOREIGN PATENT DOCUMENTS

| | | |
|---|---|---|
| JP | 5127822 | 5/1993 |
| JP | 7084705 | 3/1995 |
| JP | 9006533 | 1/1997 |
| JP | 10048625 | 2/1998 |

* cited by examiner

Primary Examiner—Bipin Shalwala
Assistant Examiner—Vincent E. Kovalick

(57) ABSTRACT

A touch panel is constructed of a top sheet member having a resistive membrane on its inner surface and a base sheet member having a resistive membrane on its inner surface, the top and base sheet members facing each other with dot spacers being located in between. The top sheet member is formed by laminating a bulge-resistant film, a polarizing plate, a quarter wavelength plate, and a light isotropic film in this order from above. A PET film which is not heat-treated so as to have a higher thermal contraction rate than the other members of the top sheet member underneath such as the polarizing plate, is used as the bulge-resistant film. Since the bulge-resistant film contracts more than the polarizing plate under a high ambient temperature, after the ambient temperature returns to normal, the bulge-resistant film does not become slack against the polarizing plate. Accordingly, the top sheet member can be kept from bulging outward.

19 Claims, 13 Drawing Sheets

Fig. 4

(TABLE 1)

| LAMINATED MATERIAL | THICKNESS $\mu$m | THERMAL LINEAR EXPANSION COEFFICIENT $10^{-5}$cm/cm/°C |
|---|---|---|
| PET FILM | 188 | 1.5 |
| POLARIZING PLATE (TAC/PVA/TAC) | 136 | 5.4 |
| QUARTER WAVELENGTH PLATE(PC) | 80 | 6.2 |
| LIGHT ISOTROPIC FILM (POLYOLEFIN RESIN) | 188 | 6.2 |
| GLASS | 1100 | 0.7 |

FIG.5

(TABLE 2)

(1) HEATED PET FILM ADHERED  GLASS THICKNESS 1100 μm

| ATMOSPHERIC CONDITION | ① IN ATMOSPHERE | | | | | ② AFTER REMOVAL | | | | |
|---|---|---|---|---|---|---|---|---|---|---|
| | AMOUNT OF BULGE (mm) | OPERATING WEIGHT(g) | | | | AMOUNT OF BULGE (mm) | OPERATING WEIGHT(g) | | | |
| | | 80 | 100 | 130 | 200 | | 80 | 100 | 130 | 200 |
| 70°C | 0 | ○ | | | | 1 | × | × | △ | ○ |
| 40°C 90% | 0 | ○ | | | | 0 | ○ | | | |
| 50°C 90% | 0 | ○ | | | | 1 | × | △ | ○ | |
| 60°C 90% | 0 | ○ | | | | 1 | × | × | △ | ○ |
| −20°C | 1 | × | × | △ | ○ | 0 | ○ | | | |

FIG.6
(TABLE 3)
(2) HEATED PET FILM ADHERED (WITH STRESS RELIEVING ADHESIVE)   GLASS THICKNESS 1100 μm

| ATMOSPHERIC CONDITION | ① IN ATMOSPHERE | | | | | ② AFTER REMOVAL | | | | |
| --- | --- | --- | --- | --- | --- | --- | --- | --- | --- | --- |
| | AMOUNT OF BULGE (mm) | OPERATING WEIGHT(g) | | | | AMOUNT OF BULGE (mm) | OPERATING WEIGHT(g) | | | |
| | | 80 | 100 | 130 | 200 | | 80 | 100 | 130 | 200 |
| 70°C | 0 | ○ | | | | 1 | × | × | △ | ○ |
| 40°C 90% | 0 | ○ | | | | 0 | ○ | | | |
| 50°C 90% | 0 | ○ | | | | 0 | ○ | | | |
| 60°C 90% | 0 | ○ | | | | 0 | ○ | | | |
| −20°C | 1 | × | × | △ | ○ | | | | | |

FIG.7

(TABLE 4)
(3) UNHEATED PET FILM ADHERED
(WITH STRESS RELIEVING ADHESIVE)    GLASS THICKNESS 1100 μm

| ATMOSPHERIC CONDITION | ① IN ATMOSPHERE | | | | | ② AFTER REMOVAL | | | | |
|---|---|---|---|---|---|---|---|---|---|---|
| | AMOUNT OF BULGE (mm) | OPERATING WEIGHT (g) | | | | AMOUNT OF BULGE (mm) | OPERATING WEIGHT (g) | | | |
| | | 80 | 100 | 130 | 200 | | 80 | 100 | 130 | 200 |
| 70°C | 0 | ○ | | | | 0 | ○ | | | |
| 40°C 90% | 0 | ○ | | | | 0 | ○ | | | |
| 50°C 90% | 0 | ○ | | | | 0 | ○ | | | |
| 60°C 90% | 0 | ○ | | | | 0 | ○ | | | |
| −20°C | 1 | × | × | △ | ○ | | | | | |

FIG.8
(TABLE 5)

(1) HEATED PET FILM ADHERED    GLASS THICKNESS 700 μm

| ATMOSPHERIC CONDITION | ① IN ATMOSPHERE | | | | | ② AFTER REMOVAL | | | | |
|---|---|---|---|---|---|---|---|---|---|---|
| | AMOUNT OF BULGE (mm) | OPERATING WEIGHT (g) | | | | AMOUNT OF BULGE (mm) | OPERATING WEIGHT (g) | | | |
| | | 80 | 100 | 130 | 200 | | 80 | 100 | 130 | 200 |
| 70°C | 0 | ○ | | | | 1 | × | × | △ | ○ |
| 40°C 90% | 0 | ○ | | | | 0 | ○ | | | |
| 50°C 90% | 0 | ○ | | | | 1 | × | △ | ○ | |
| 60°C 90% | 0 | ○ | | | | 1 | × | × | △ | ○ |
| −20°C | 1.5 | × | × | × | × | 0 | ○ | | | |

FIG.9
(TABLE 6)
(2) HEATED PET FILM ADHERED
(WITH STRESS RELIEVING ADHESIVE)

GLASS THICKNESS 700 μm

| ATMOSPHERIC CONDITION | ① IN ATMOSPHERE | | | | | ② AFTER REMOVAL | | | | |
|---|---|---|---|---|---|---|---|---|---|---|
| | AMOUNT OF BULGE (mm) | OPERATING WEIGHT(g) | | | | AMOUNT OF BULGE (mm) | OPERATING WEIGHT(g) | | | |
| | | 80 | 100 | 130 | 200 | | 80 | 100 | 130 | 200 |
| 70°C | 0 | ○ | | | | 1 | × | × | △ | ○ |
| 40°C 90% | 0 | ○ | | | | 0 | ○ | | | |
| 50°C 90% | 0 | ○ | | | | 0 | ○ | | | |
| 60°C 90% | 0 | ○ | | | | 0 | ○ | | | |
| −20°C | 1.5 | × | × | × | × | | | | | |

FIG.10

(TABLE 7)
(3) UNHEATED PET FILM ADHERED
(WITH STRESS RELIEVING ADHESIVE)        GLASS THICKNESS 700 μm

| ATMOSPHERIC CONDITION | ① IN ATMOSPHERE | | | | | ② AFTER REMOVAL | | | | |
|---|---|---|---|---|---|---|---|---|---|---|
| | AMOUNT OF BULGE (mm) | OPERATING WEIGHT(g) | | | | AMOUNT OF BULGE (mm) | OPERATING WEIGHT(g) | | | |
| | | 80 | 100 | 130 | 200 | | 80 | 100 | 130 | 200 |
| 70°C | 0 | ○ | | | | 0 | ○ | | | |
| 40°C 90% | 0 | ○ | | | | 0 | ○ | | | |
| 50°C 90% | 0 | ○ | | | | 0 | ○ | | | |
| 60°C 90% | 0 | ○ | | | | 0 | ○ | | | |
| −20°C | 1.5 | × | × | × | × | | | | | |

GLARE-RESISTANT TOUCH PANEL

BACKGROUND OF THE INVENTION

1. Field of the Invention

The present invention relates to a glare-resistant touch panel, and more particularly relates to a technique for improving the operability of the touch panel in use environments that involve relatively high temperatures.

2. Description of the Related Art

A typical touch panel is constructed of an ultrathin glass plate (base sheet member) and a flexible transparent resin film (top sheet member) that are set facing each other and have resistive membranes respectively on their opposed surfaces, with spacers being placed in between the two sheet members in order to provide a certain spacing.

With an ever-widening range of applications of such touch panels, the demand for products that provide new additional values is growing in recent years. As an example, for combined use with a liquid crystal display (LCD) panel equipped in an outdoor-use device such as a car navigation system, a glare-resistant touch panel which is coated with a film of polarizer on its surface has been devised to keep the visibility of the display of the LCD panel from decreasing due to irregular reflections of incident light.

The polarizer used here is generally made of a resin film. Such a polarizing resin film has a thermal linear expansion coefficient eight to nine times that of glass which forms the base sheet member.

This large difference in thermal linear expansion coefficient between the top and base sheet members causes the following problems. As the temperature rises, the whole top sheet member including the polarizer bulges outward, thereby seriously deforming the touch panel. Besides, the operability of the touch panel decreases, as the space between the top and base sheet members widens and forces the user to apply a greater pressure to operate the touch panel. Given the recent trend toward larger touch panels with upsizing of LCD panels, the amount of outward bulge of the top sheet member is likely to increase, which will further degrade the touch panel's operability.

This problem can be overcome by coating the upper surface of the polarizer with a resin film whose thermal linear expansion coefficient is lower than that of the polarizer, to keep the polarizer from bulging outward. An experiment on operability was conducted using a touch panel in which a PET (polyethylene terephthalate) film was adhered to the upper surface of the polarizer as a bulge-resistant film. As a result, the touch panel demonstrated high operability in a normal range of ambient temperatures. However, when left standing at a high ambient temperature over 60° C. for a long time and then removed from that atmosphere and put in a normal temperature (around 25° C.), the touch panel bulged upward and became seriously deformed, resulting in poor operability.

Inside a car parked in an outdoor parking lot under the scorching sun, the ambient temperature can easily reach as high as 80° C. especially near a dashboard. If a car navigation system equipped with a touch panel is left in such a hostile condition, the top sheet member of the touch panel will bulge upward greatly, causing a significant decrease in operability.

SUMMARY OF THE INVENTION

In view of the above problems, the present invention aims to provide a touch panel whose appearance and operability are not impaired even after being left in high temperature environments, despite its use of a polarizer in a top sheet member to ensure visibility outdoors.

The above object can be achieved by a resistive-membrane touch panel including: a first sheet member having a first resistive membrane on a main surface thereof; a second sheet member that is flexible and has a second resistive membrane on a main surface thereof, the second sheet member being opposed to the first sheet member with a spacer interposed in between in such a manner that the second resistive membrane and the first resistive membrane face each other with a certain spacing therebetween; and a third sheet member that is laminated on an outer main surface of the second sheet member, wherein the second sheet member has a polarizing property, and the third sheet member has a thermal contraction rate no lower than a thermal contraction rate of the second sheet member.

Since the second sheet member has the polarizing property, the touch panel is guarded against glare. When such a touch panel is mounted on the front of a display panel such as an LCD panel, the visibility of the content displayed on the display panel is improved. Also, even when the second sheet member and the third sheet member contract in a high ambient temperature, after the ambient temperature returns to normal the third sheet member will not become slack against the second sheet member, because the thermal contraction rate of the third sheet member is equal to or larger than that of the second sheet member underneath it. Hence the outward bulge of the touch panel is effectively suppressed, and its appearance and operability is maintained regardless of temperature variations.

Here, the third sheet member may have a lower thermal linear expansion coefficient than the second sheet member. Even when the second sheet member is expanding to bulge outward as the ambient temperature rises, the third sheet member with the lower thermal linear expansion coefficient serves to suppress such an outward bulge of the second sheet member, so that the distance between the first and second sheet members will not widen substantially. As a result, the appearance and operability of the touch panel can be maintained regardless of temperature variations.

Here, the second sheet member and the third sheet member may be adhered with an adhesive that has a stress relieving property. The adhesive layer formed as such can absorb thermal stress growing between the second and third sheet members at elevated temperatures. Accordingly, no deviation from alignment will occur between the second and third sheet members, so that the operability of the touch panel can be maintained. Here, the viscoelasticity of the stress relieving adhesive is preferably in a range of $1.0 \times 10^5 \text{dyn/cm}^2$ to $1.2 \times 10^6 \text{dyn/cm}^2$. Also, the third sheet member may be coated with a hard coating material on its surface which is to be adhered to the second sheet member. In so doing, the adhesion of the third sheet member with the stress relieving adhesive is strengthened, which improves the durability of the touch panel.

Here, the third sheet member may have a lower hygroscopic linear expansion coefficient than the second sheet member. Even when the second sheet member is expanding to bulge outward due to moisture absorption, the third sheet member with the lower hygroscopic linear expansion coefficient serves to keep the second sheet member from bulging outward. Thus, the outward bulge of the touch panel due to moisture absorption can be effectively suppressed.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 4 is a table showing thicknesses and thermal linear expansion coefficients of structural members laminated in the touch panel;

FIG. 5 is a table showing the results of experiment on the operability of the touch panel when a 1100 μm-thick glass plate was used as a base sheet member and a heated PET film was adhered to a polarizing plate as a bulge-resistant film;

FIG. 6 is a table showing the results of experiment on the operability of the touch panel when a 1100 μm-thick glass plate was used as the base sheet member and a heated PET film was adhered to the polarizing plate as the bulge-resistant film using a stress relieving adhesive;

FIG. 7 is a table showing the results of experiment on the operability of the touch panel when a 1100 μm-thick glass plate was used as the base sheet member and an unheated PET film was adhered to the polarizing plate as the bulge-resistant film using the stress relieving adhesive;

FIG. 8 is a table showing the results of experiment on the operability of the touch panel when a 700 μm-thick glass plate was used as the base sheet member and a heated PET film was adhered to the polarizing plate as the bulge-resistant film;

FIG. 9 is a table showing the results of experiment on the operability of the touch panel when a 700 μm-thick glass plate was used as the base sheet member and a heated PET film was adhered to the polarizing plate as the bulge-resistant film using the stress relieving adhesive;

FIG. 10 is a table showing the results of experiment on the operability of the touch panel when a 700 μm-thick glass plate was used as the base sheet member and an unheated PET film was adhered to the polarizing plate as the bulge-resistant film using the stress relieving adhesive;

DESCRIPTION OF THE PREFERRED EMBODIMENT(S)

The following is a description on a touch panel according to an embodiment of the present invention, with reference to the figures.

(General Construction of a Touch Panel 100)

Figure 1:
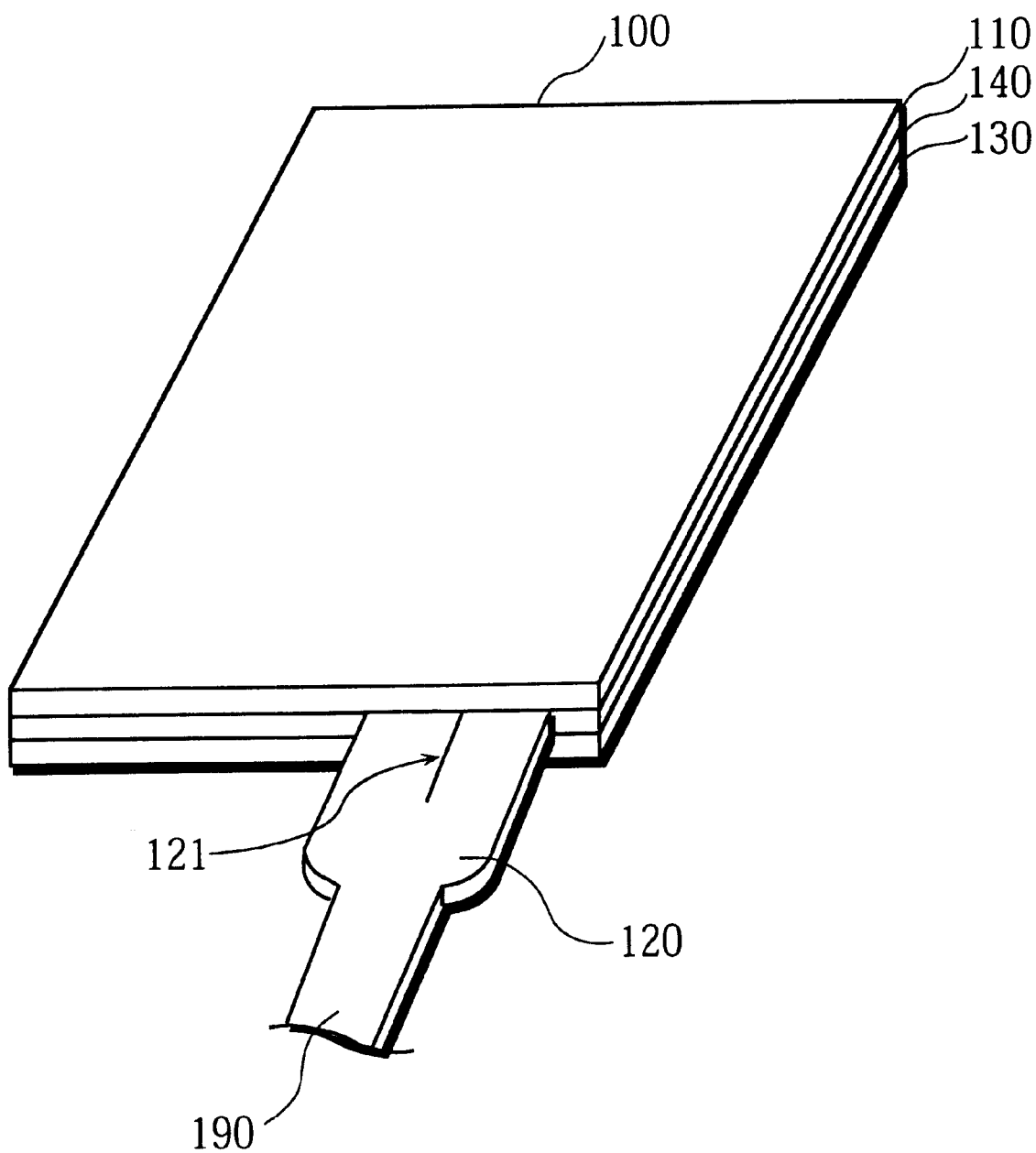
FIG. 1 is a perspective view of a touch panel according to an embodiment of the invention.

FIG. 1 is a perspective view of a touch panel 100 according to the embodiment of the invention.

As illustrated, the touch panel 100 is constructed by laminating a top sheet member 110 and a base sheet member 130 with a spacer 140 being placed therebetween.

The top sheet member 110 is a flexible, transparent sheet member for receiving user input made with a finger or an input pen, and is made by laminating a plurality of resin films (described later). Reference numeral 120 is a connector unit that is connected to electrodes inside the touch panel 100.

Figure 2:
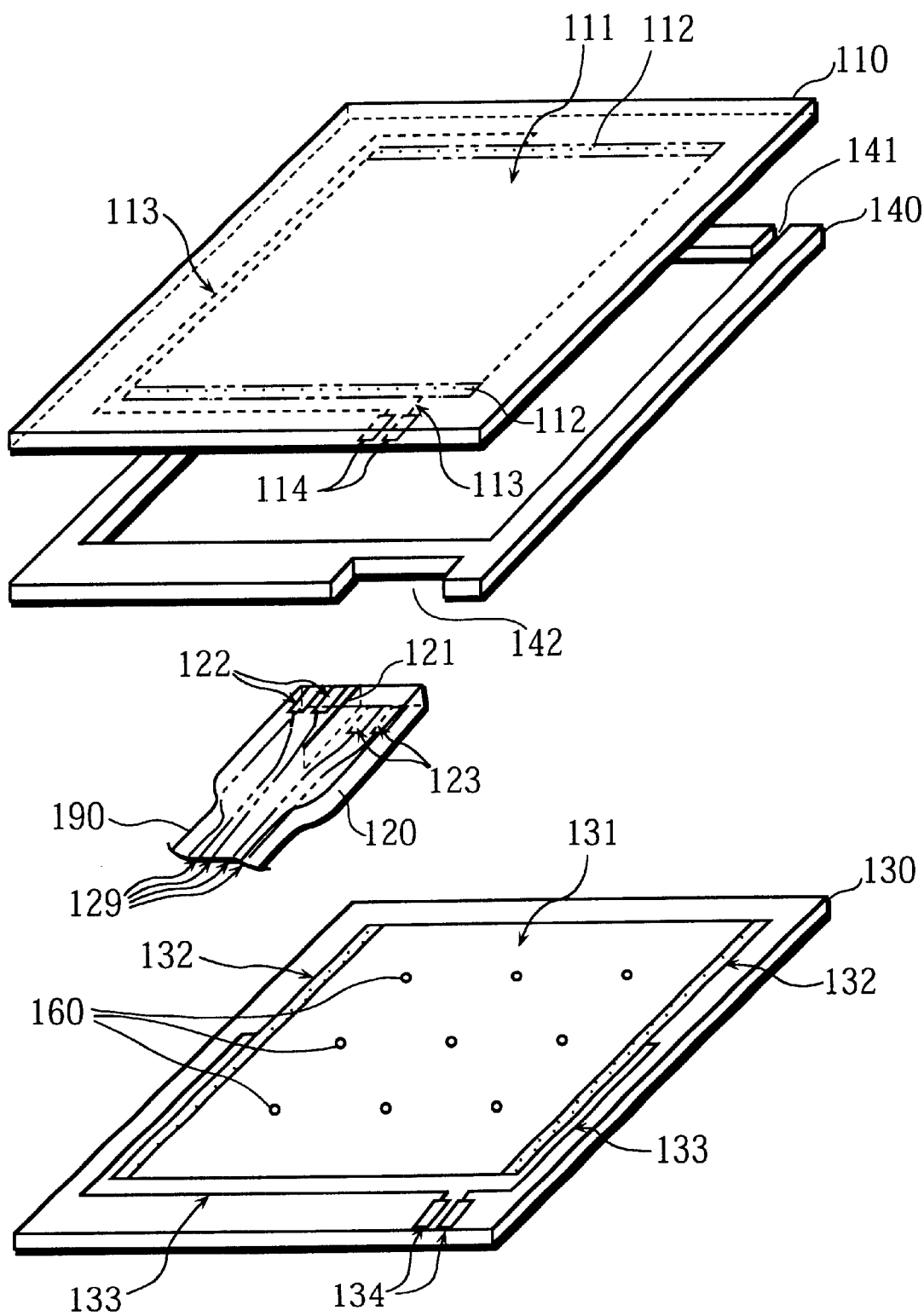
FIG. 2 is an exploded view showing the construction of the touch panel.

FIG. 2 is an exploded view of the touch panel 100 shown in FIG. 1.

In the FIGURE, the spacer 140 has a shape of a picture frame except for a clearance 141. The spacer 140 is made of a PET film or the like. An adhesive is applied to both upper and lower sides of the spacer 140, and the top sheet member 110 and the base sheet member 130 are bonded with the spacer 140 along their edges. The clearance 141 serves to release air from inside the touch panel 100. As the ambient temperature changes, air trapped between the top sheet member 110 and the base sheet member 130 expands or contracts. However, with the clearance 141 permitting the passage of air from/to the outside, the internal pressure is kept equal to the external pressure. Accordingly, there will be no degradation in operability caused by the internal pressure increasing against the external pressure due to the thermal expansion of the inside air. The larger the size of the touch panel 100, the larger the volume of the space between the top sheet member 110 and the base sheet member 130 becomes, which means the greater amount of air flows through the clearance 141 as the temperature changes. In such a case, it may be necessary to provide more clearances like the clearance 141 in the touch panel 100.

In the case of FIG. 2, in addition to the clearance 141 there is one more clearance at the hindmost corner of the spacer 140 (not shown).

Also, the spacer 140 has a recessed part 142 into which the connector unit 120 is to be inserted.

Dot spacers 160 are provided at a certain interval between the base sheet member 130 and the top sheet member 110 inside the inner edges of the spacer 140. Together with the spacer 140, the dot spacers 160 serve to keep the distance between the opposed surfaces of the top sheet member 110 and base sheet member 130 uniformly at around 100 μm.

A resistive membrane 111 made of ITO (indium tin oxide) is formed almost throughout the lower surface of the top sheet member 110 by sputtering. A pair of electrodes 112 are disposed on two opposite sides of the resistive membrane 111. Also, a pair of electrode terminals 114 to be coupled to a pair of connector electrodes 122 formed on the connector unit 120 are located on part of the lower surface of the top sheet member 110 which is not covered with the resistive membrane 111 and which meets the connector unit 120. The pair of electrode terminals 114 and the pair of electrodes 112 are connected via a pair of wiring patterns 113.

The base sheet member 130 is made of ultrathin glass. Like the top sheet member 110, a resistive membrane 131 made of ITO is formed almost throughout the upper surface of the base sheet member 130 by sputtering. A pair of electrodes 132 are disposed on two opposite sides, that are perpendicular to the two sides of the resistive membrane 111 on which the pair of electrodes 112 are disposed, of the resistive membrane 131. Also, a pair of electrode terminals 134 to be coupled to a pair of connector electrodes 123 formed on the connector unit 120 are located on part of the upper surface of the base sheet member 130 which is not covered with the resistive membrane 131 and which meets the connector unit 120. The pair of electrode terminals 134 and the pair of electrodes 132 are connected via a pair of wiring patterns 133.

The connector unit 120 is one end of a connecting cable 190 which is made by forming four wiring patterns 129 on a resin film of PET or polyimide with a paste made of silver or the like and sandwiching them with another resin film of the same material. On the upper and lower surfaces of this connector unit 120 are exposed the ends of the four wiring patterns 129 in pairs, with carbon printing being applied to the exposed ends to form the pair of connector electrodes 122 and the pair of connector electrodes 123.

The reason that the four wiring patterns and the four connector electrodes are not separated but combined in a single connector unit is to save both materials cost and man-hours needed for manufacturing.

In the completely assembled touch panel 100, the pair of connector electrodes 122 and the pair of connector electrodes 123 are respectively bonded to the pair of electrode terminals 114 of the top sheet member 110 and the pair of electrode terminals 134 of the base sheet member 130. This bonding of a connector electrode and an electrode terminal is done by first coating the bonding area with a mixed silver-carbon conductive paste which is the common material of the wiring patterns, and then applying thermocompression bonding from both sides thereof.

Also, an incision 121 is provided between the pair of connector electrodes 122 and the pair of connector electrodes 123 in the connector unit 120, in order to relieve stress induced by the difference in thermal linear expansion coefficient between the top sheet member 110 and the base sheet member 130. Even when the top sheet member 110 and the base sheet member 130 expand by differing degrees as the temperature rises, stress acting on the connector unit 120 due to the difference in expansion can be absorbed through the incision 121. Hence poor contact and break hardly occur in this part over a wide range of temperatures.

(Laminated Structure of the Touch Panel 100)

Figure 3:
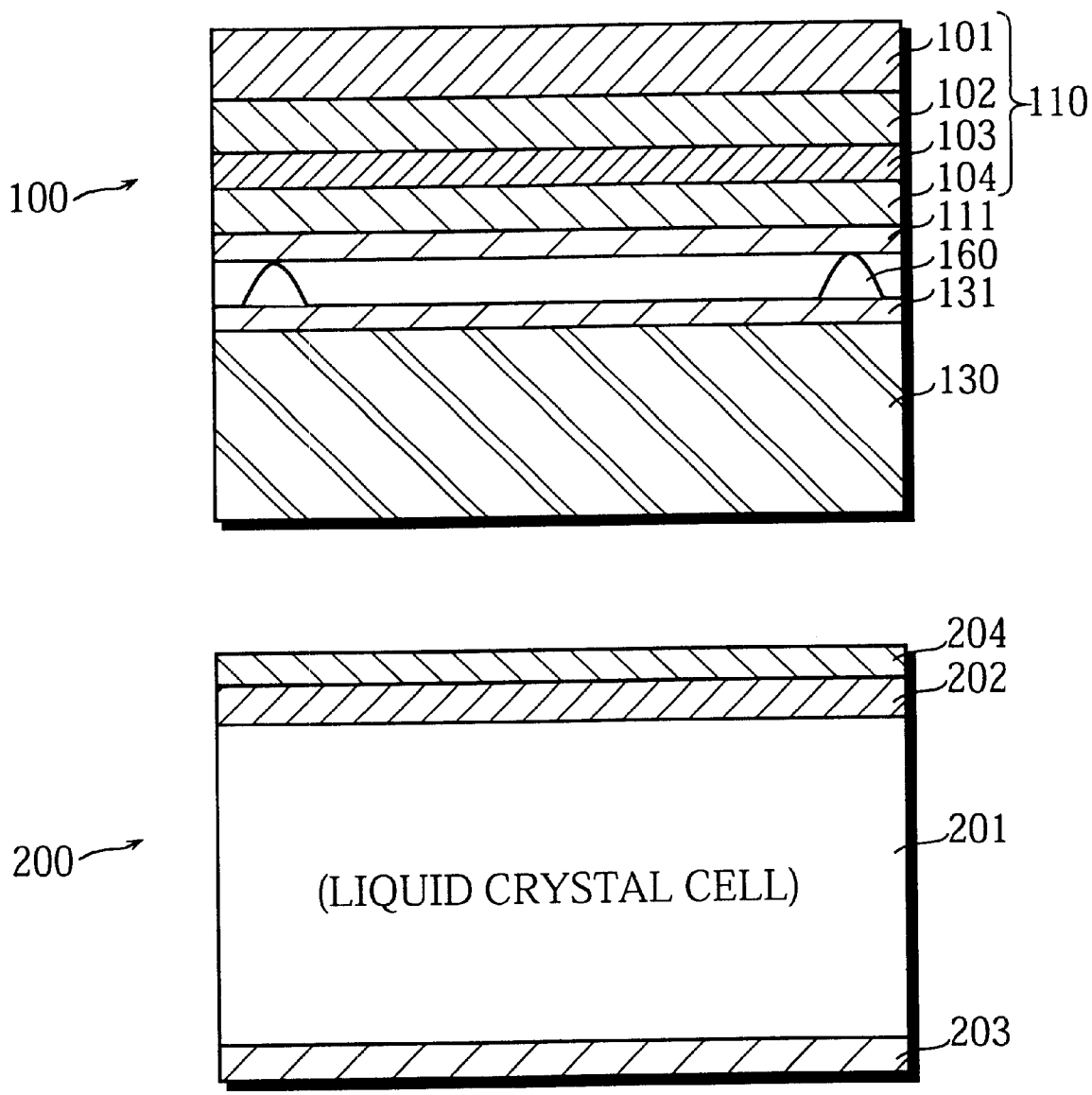
FIG. 3 is a partly enlarged sectional view showing the laminated structure of the touch panel.

FIG. 3 is a partial expanded sectional view showing the laminated structure of the touch panel 100. For convenience in explanation, the laminated structure of an LCD panel 200 on which the touch panel 100 is mounted is also shown.

In the FIGURE, the top sheet member 110 is made by laminating a bulge-resistant film 101, a polarizing plate 102, a quarter wavelength plate 103, and a light isotropic film 104 in this order from above, through the use of an adhesive (not shown). The resistive membrane 111 is formed underneath the bottommost light isotropic film 104.

In this embodiment, a PET film which is not heat-treated after manufacturing (hereinafter, "unheated PET film") is used as the bulge-resistant film 101.

The top sheet member 110 is opposed to the base sheet member 130 with the dot spacers 160 being placed in between. The resistance membrane 131 is formed on the opposed surface of the base sheet member 130.

FIG. 4 shows table 1 which presents thicknesses and thermal linear expansion coefficients of structural members laminated in the touch panel 100.

The polarizing plate 102 used here is made by sandwiching a drawn PVA (polyvinyl alcohol) film, on which a dichromatic pigment such as iodine or dichromatic dye has been adsorbed and oriented, between TAC (triacetylacetate) films as protective films using an adhesive. In this embodiment, the thickness of the PVA film is 20 $\mu$m and the thickness of the two TAC films is 116 $\mu$m (58 $\mu$m×2). Since the thin PVA film expands with the thick TAC films, the thermal linear expansion coefficient of the polarizing plate 102 as a whole is approximately equal to that of the TAC films (5.4×10$^{-5}$cm/cm/%).

The quarter wavelength plate 103 is made from a PC (polycarbonate) film.

The light isotropic film 104 is a resin film that exhibits no polarization against light incident thereupon. In this embodiment, a norbornene thermoplastic transparent resin having an aliphatic ring structure, for example, ARTON film manufactured by JSR Corporation (ARTON is a trademark of the company), is used as the light isotropic film 104. The ARTON film, for its excellent transparency, surface hardness, and heat resistance, lends itself to use for touch panels.

Directly underneath the touch panel 100 is provided the transparent LCD panel 200. This LCD panel 200 has a well known construction made up of a pair of polarizing plates 202 and 203 and a liquid crystal cell 201 interposed therebetween. A quarter wavelength plate 204 is laminated on the upper surface of the polarizing plate 202.

Also, a backlight source (not shown) is located underneath the LCD panel 200.

Here, instead of being laminated on the upper surface of the LCD panel 200, the quarter wavelength plate 204 may be adhered to the lower surface of the base sheet member 130 of the touch panel 100. As long as the quarter wavelength plate 204 is positioned between the base sheet member 130 and the LCD panel 200, the following improvements in visibility of the display of the LCD panel 200 can be attained.

The effects produced by the polarizing plate 102 and the quarter wavelength plates 103 and 204 are explained below.

The polarizing plate 102 is set so that its polarizing axis is parallel to the polarizing axis of the polarizing plate 202 in the LCD panel 200. Meanwhile, the quarter wavelength plate 103 is set so that its optical axis forms an angle of 45° with the polarizing axis of the polarizing plate 102.

Extraneous light incident through the bulge-resistant film 101 is converted into linearly polarized light by the polarizing plate 102, and further converted into circularly polarized light by the quarter wavelength plate 103. This circularly polarized light is reflected partly off the upper surfaces of the base sheet member (glass) 130, LCD panel 200, and/or resistive membranes 111 and 131 and as a result reenters the quarter wavelength plate 103 where it is changed to linearly polarized light. Here, since the circularly polarized light was reversed in rotation direction when reflected, the polarizing plane of the linearly polarized light emerging from the quarter wavelength plate 103 has been rotated 90° with respect to the polarizing plane of the linearly polarized light previously emitted from the polarizing plate 102. Therefore, the linearly polarized light that has emerged from the quarter wavelength plate 103 cannot pass through the polarizing plate 102 and go up any further.

Thus, when extraneous light enters the touch panel 100 and is reflected off inside the touch panel 100, the reflected light will not leave the touch panel 100. Accordingly, the user can get a clear view of the content displayed on the LCD panel 200 outdoors, without suffering from glare.

The quarter wavelength plate 204 attached to the upper surface of the LCD panel 200 is set so that its optical axis forms an angle of 45° with the polarizing axis of the polarizing plate 202. Since the polarizing axis of the polarizing plate 202 -a is set to be parallel to that of the polarizing plate 102, the optical axis of the quarter wavelength plate 204 forms an angle of 45° with the polarizing axis of the polarizing plate 102, too. It should be noted here that the optical axis of the quarter wavelength plate 204 is oriented so as to form an angle of 45° with the polarizing axis of the polarizing plate 102 in a direction opposite to a direction in which the optical axis of the quarter wavelength plate 103 forms an angle of 45° with the polarizing axis of the polarizing plate 102. That is to say, the optical axes of the quarter wavelength plates 103 and 204 are set perpendicular to each other.

With this arrangement, light from the backlight source which becomes linearly polarized light having passed through the polarizing plate 202 is converted into circularly polarized light by the quarter wavelength plate 204. This circularly polarized light is changed again into linearly polarized light when passing through the quarter wavelength plate 103. Here, since the optical axes of the quarter wavelength plates 103 and 204 are perpendicular to each other, the polarizing plane of this linearly polarized light emerging from the quarter wavelength plate 103 recovers the original orientation, that is, the polarizing plane of the linearly polarized light is parallel to the polarizing plane of the linearly polarized light immediately after passing through the polarizing plate 202. Also, since the polarizing axes of the polarizing plates 102 and 202 are parallel to each other, the polarizing plane of the linearly polarized light that has traveled through the quarter wavelength plate 103 from the backlight source is parallel to the polarizing axis of the polarizing plate 102, so that this linearly polarized light can pass through the polarizing plate 102 as it is. Accordingly, light from the backlight source is emitted to the outside without being blocked by the polarizing plate 102 and the quarter wavelength plate 103 which are disposed to guard against glare. Thus, a sufficient amount of light can be obtained with no need to increase the output of the backlight source, which ensures high visibility.

As is clear from table 1 in FIG. 4, the thermal linear expansion coefficient of each of the polarizing plate 102, the quarter wavelength plate 103, and the light isotropic film 104 is about eight to nine times that of the glass which constitutes the base sheet member 130. Accordingly, as the temperature rises, these structural members of the top sheet member 110 expand by greater amounts than the glass.

As mentioned earlier, the top sheet member 110 and the base sheet member 130 are securely fixed to each other at their edges via the spacer 140. As such, even within a normal range of temperatures, the thermal expansion of the top sheet member 110 goes upward with temperature and results in the aforementioned outward bulge, thereby impairing the appearance and operability of the touch panel 100.

According to this embodiment, however, a PET film a thermal linear expansion coefficient of which is lower than that of the polarizing plate 102 is placed on the top of the top sheet member 110 as the bulge-resistant film 101. Moreover, this PET film is not heat-treated and so has a high thermal contraction rate. Through the use of such an unheated PET film as the bulge-resistant film 101, the highly efficient touch panel 100 can be attained which hardly develops any outward bulge not only in a normal temperature but even after being exposed to a temperature as high as 70° C. for long hours.

The operability of this touch panel 100 is explained below, based on the following experimental results.
(Experimental Results)

Tables 2, 3, and 4 in FIGS. 5, 6, and 7 present the results of three experiments which, in comparison, demonstrate that the bulge of the top sheet member 110 can be suppressed by employing an unheated PET film as the bulge-resistant film 101.

These experiments were conducted in the following setting. When the temperature was –20° C. or 70° C., the atmosphere was set to be dry with almost no humidity, whereas when the temperature was 40° C., 50° C., or 60° C., the atmosphere was set to be damp with a high humidity of 90%. For each of these atmospheres, the maximum amount of bulge was measured in case ① where the touch panel was left in the atmosphere for 300 hours and in case ② where after being left in the atmosphere for 300 hours the touch panel was removed from the atmosphere and left in a normal temperature and humidity (approximately 25° C. and 50%) for 24 hours.

The materials and thicknesses of structural members of a touch panel used in each experiment are the same as shown in table 1, except for the following differences. In the experiment shown in table 2, a heat-treated PET film (hereafter, "heated PET film") was adhered to the polarizing plate 102 as the bulge-resistant film 101 via an ordinary adhesive conventionally used for resin films. In the experiment in table 3, a heated PET film was adhered to the polarizing plate 102 as the bulge-resistant film 101 via a stress relieving adhesive (explained later). In the experiment in table 4, an unheated PET film was adhered to the polarizing plate 102 as the bulge-resistant film 101 via the stress relieving adhesive. The size of the touch panel in each experiment was 260 mm×205 mm (12.1 inches).

In each experiment, the amount of bulge was measured in millimeters as a displacement of a point where the largest bulge occurred from a reference plane. The reference plane here is the upper surface of the top sheet member 110 under the normal temperature and humidity.

In addition to the above bulge test, the operability of the touch panel was evaluated by imposing various operating weights (80 g, 100 g, 130 g, and 200 g) onto the touch panel with an ordinary input pen (made of polyacetal, 0.8 mm in pen tip radius). This operability test was repeated for ten sample touch panels of the same type that had been put under the same atmospheric condition among the above atmospheric conditions in case ① and case ②. If all ten samples operated when pressed with a certain operating weight by the input pen, the operability was rated as "○" for that operating weight. If any one of the ten samples did not operate, the operability was rated as "Δ" for the operating weight. If none of the ten samples operated, the operability was rated as "X" for the operating weight.

Needless to say, if all ten samples operate with a small operating weight, the touch panel has high operability. In terms of practicality, it is desirable if all ten samples operate with an operating weight no larger than 100 g to 130 g after the temperature is changed to normal. In contrast, if some samples do not operate with an operating weight over 200 g, the touch panel has poor operability and low product quality.

For the touch panel in which the heated PET film was adhered to the polarizing plate 102 with the ordinary adhesive, the experimental results were shown in table 2 in FIG. 5. In case ②, the operability was rated as "○" with the operating weight 80 g, only when the ambient temperature changed from 40° C. to normal. For the higher temperature conditions, the touch panel did not show particularly high operability, as even in the case of 50° C. the operability was not rated as "○" until the operating weight of 130 g was imposed. Suppose the same experiment was conducted on a conventional touch panel that does not have the bulge-resistant film 101. When left standing in an ambient temperature of 40° C. (90% in humidity) for 24 hours, the conventional touch panel bulged by 2.5 mm and became seriously deformed. Besides, the operability was rated as "X" even with an operating weight of 200 g or larger. Thus, the touch panel used in the experiment in table 2 certainly demonstrates higher operability than the conventional touch panel. However, it still has plenty of room for improvement. To further improve operability, an adhesive that will remain elastic even after being dried (stress relieving adhesive) was used to bond the polarizing plate 102 and the heated PET film as the bulge-resistant film 101, in the experiment shown in table 3 in FIG. 6. The experiment produced satisfactory results, as the operability was rated as "○" with the operating weight 80 g except when the ambient temperature dropped from the highest 70° C. to normal.

Such different outcomes between the use of the ordinary adhesive and the use of the stress relieving adhesive can be attributed to the following cause.

By adhering the bulge-resistant film 101 of a lower thermal linear expansion coefficient to the upper surface of the polarizing plate 102, the thermal expansion of the polarizing plate 102 induced by a rise in temperature is suppressed and the polarizing plate 102 is kept from bulging upward. However, when the touch panel 100 is exposed to a temperature of 40° C. or higher for long hours, thermal stress acting between the bulge-resistant film 101 and the polarizing plate 102 grows and eventually "deviation" appears in the adhesive layer therebetween in such a direction that would relieve the thermal stress. Then, once the temperature has dropped to normal, the polarizing plate 102 with a higher thermal linear expansion coefficient contracts by a greater extent than the bulge-resistant film 101 while the deviation remains, as a result of which the bulge-resistant film 101 becomes slack and bulges upward. This problem can be solved by employing the stress relieving adhesive that has greater elasticity than the ordinary adhesive, to allow the adhesive layer absorb and alleviate thermal stress acting between the bulge-resistant film 101 and the polarizing plate 102. With the use of such a stress relieving adhesive between the bulge-resistant film 101 and the polarizing plate 102, even if deviation occurs therebetween when the ambient temperature is high, such deviation can be resolved by the elastic force of the adhesive after the ambient temperature returns to normal, so that the two members are brought back into proper alignment. Hence the outward bulge of the bulge-resistant film 101 is suppressed and the operability is substantially improved.

The property of being able to relieve stress (stress relieving property) can be measured by viscoelasticity G' (elasticity modulus) of an adhesive. The stress relieving adhesive used in this embodiment showed viscoelasticity of $5.4 \times 10^5 dyn/cm^2$ (in 25° C. and 10 Hz) after drying. Such a stress relieving adhesive delivers improvements in bulge resistance and operability.

If the viscoelasticity of an adhesive is too small, its adhesion decreases. To be able to bond two resin films as in this embodiment, in general viscoelasticity of at least $1.0 \times 10^5 dyn/cm^2$ is required. While the ordinary adhesive used in the experiment in table 2 had viscoelasticity of $1.5 \times 10^6 dyn/cm^2$ it was found by experiment that viscoelasticity of $1.0 \times 10^6 dyn/cm^2$ was sufficient to suppress the outward bulge to a certain extent. Accordingly, viscoelasticity no greater than $1.2 \times 10^6 dyn/cm^2$ (i.e. about mid-viscoelasticity between $1.0 \times 10^6 dyn/cm^2$ and $1.5 \times 10^6 dyn/cm^2$) should be enough to deliver a bulge-resistant effect greater than the ordinary adhesive. It is therefore preferable for the stress relieving adhesive to have viscoelasticity in a range of $1.0 \times 10^5 dyn/cm^2$ to $1.2 \times 10^6 dyn/cm^2$, in order to effectively suppress the outward bulge without undermining the adhesion between the bulge-resistant film 101 and the polarizing plate 102.

If, on the other hand, the stress relieving adhesive is too liquid, there is a danger that lower-boiling ingredients contained in the adhesive vaporize under high temperature conditions and bubbles emerge in the adhesive layer between the bulge-resistant film 101 and the polarizing plate 102. When this happens, heat resistance or heat-moisture resistance of the adhesive layer deteriorates. To avoid such deterioration, the viscoelasticity of the stress relieving adhesive is more preferably no lower than $4.0 \times 10^5 dyn/cm^2$. Also, to maximize the bulge-resistant effect, the viscoelasticity of the stress relieving adhesive is more preferably no higher than $8.0 \times 10^5 dyn/cm^2$.

Here, if the bulge-resistant film 101 is too thin, it cannot endure the thermal expansion of the lower members and will end up expanding itself. Therefore, the bulge-resistant film 101 needs to have a certain thickness. On the other hand, if the bulge-resistant film 101 is too thick, it cannot exhibit enough flexibility and so undermines the operability of the touch panel 100. Accordingly, the thickness of the bulge-resistant film 101 is preferably in a range of 50 μm to 250 μm. More preferably, the thickness of the bulge-resistant film 101 is in a range of 125 μm to 188 μm, to thoroughly suppress the bulge of the top sheet member 110 and maintain desired operability over a wider range of temperatures. In the present embodiment, a PET film having a thickness of 188 μm is used as the bulge-resistant film 101, as shown in table 1 in FIG. 4.

However, despite the use of the stress relieving adhesive, no improvement over the touch panel used in the experiment in table 2 was seen when the ambient temperature changed from the highest 70° C. to normal, as the operability was rated as "○" only with the operating weight of 200 g in table 3.

Theoretically, the outward bulge of the polarizing plate 102 caused by thermal expansion should have been suppressed if a resin film with a lower thermal linear expansion coefficient was adhered to the polarizing plate 102 as the bulge-resistant film 101 via the stress relieving adhesive. Therefore, the outward bulge after the ambient temperature dropped from 70° C. to normal should be attributed not to the above thermal expansion cause but to another cause.

The cause of the outward bulge in a temperature decrease from 70° C. to normal lies in the difference in thermal contraction rate between the heated PET film and the polarizing plate.

Generally, resin films have a thermal property that changes in thermal linear expansion coexist with changes in thermal contraction. In a normal range of temperatures up to around 50° C., thermal linear expansion changes are more dominant and so a resin film expands with temperature. However, as the temperature exceeds the normal temperature range and approaches a glass transition temperature, thermal contraction changes become more dominant. Because of this property, when the use environment is likely to involve sudden temperature changes, a PET film is normally heat-treated to have a low thermal contraction rate prior to use, so as not to contract greatly and change in dimension at elevated temperatures. Hence a heated PET film with a low thermal contraction rate was used in the above experiments in tables 2 and 3. In these experiments, however, the very use of the heated PET film caused poor operability observed when the ambient temperature changed from 70° C. to normal.

Since thermal linear expansion surpasses thermal contraction in each of the bulge-resistant film 101 and the polarizing plate 102 when the ambient temperature stands at 70° C., the bulge-resistant film 101 does not expand as much as the polarizing plate 102. As a result, the polarizing plate 102 is kept from bulging upward. However, though thermal expansion is a reversible change, thermal contraction is an irreversible change. Accordingly, once thermal contraction has occurred, that contraction remains even after the temperature has returned to normal. Here, if the bulge-resistant film 101 is the heated PET film whose thermal contraction rate is lower than the polarizing plate 102, the bulge-resistant film 101, which has kept the polarizing plate 102 from bulging upward in high temperature, will end up becoming slack against the polarizing plate 102 when the temperature returns to normal, due to a smaller shrinkage of the bulge-resistant film 101 than the polarizing plate 102. When this happens, the bulge-resistant film 101 itself bulges upward, thereby impairing the operability of the touch panel 100.

This can be solved by adopting a material whose thermal contraction rate is higher than the polarizing plate 102 as the bulge-resistant film 101. In the experiment in table 4 in FIG. 7, an unheated PET film whose thermal contraction rate is higher than that of the polarizing plate 102 was used as the bulge-resistant film 101. As a result, no bulge was found and the operability was rated as "○" with the smallest operating weight 80 g when the ambient temperature changed from 70° C. to normal.

When left standing at a temperature of 80° C. for 50 hours, the unheated PET film showed a shrinkage of about 1%, whereas the polarizing plate (mainly made of TAC films) showed a shrinkage of about 0.5%. In the case of the heated PET film, meanwhile, even when left standing at a temperature as high as 120° C. for 5 hours, it only showed a very low shrinkage of about 0.14%.

Thus, by using the unheated PET film with a higher thermal contraction rate than the polarizing plate 102 as the bulge-resistant film 101, high operability can be ensured in almost all temperature conditions which could happen in actual use of touch panels.

While in the above experiments a glass plate of 1100 $\mu$m in thickness was used as the base sheet member 130, a thinner glass plate is more advantageous for weight reduction of the touch panel 100, especially when the touch panel 100 is equipped in a portable device.

Tables 5, 6, and 7 shown in FIGS. 8, 9, and 10 present the results of three experiments which respectively correspond to the three experiments shown in tables 2, 3, and 4, except that a glass plate of 700 $\mu$m in thickness was used as the base sheet member 130. Which is to say, the experiment in table 5 was conducted on a touch panel the bulge-resistant film 101 of which is a heated PET film adhered with the ordinary adhesive and the base sheet member 130 of which is a 700 $\mu$m-thick glass plate. The experiment in table 6 was conducted on a touch panel the bulge-resistant film 101 of which is a heated PET film adhered with the stress relieving adhesive and the base sheet member 130 of which is a 700 $\mu$m-thick glass plate. The experiment in table 7 was conducted on a touch panel the bulge-resistant film 101 of which is an unheated PET film adhered with the stress relieving adhesive and the base sheet member 130 of which is a 700 $\mu$m-thick glass plate.

In each of these experiments, while the ambient temperature was −20° C., the amount of bulge was 1.5 mm and the operability was rated as "X" even with the maximum operating weight 200 g. This can be explained as follows. Since the thermal linear expansion coefficient of the polarizing plate 102 is higher than that of the bulge-resistant film 101, in an extreme low temperature the polarizing plate 102 contracts by a greater extent than the bulge-resistant film 101. This causes such a bending force that bulges the top sheet member 110 upward. Besides, because of the thinness of the base sheet member 130 (700 $\mu$m), the base sheet member 130 slightly sags downward due to this bending force.

Meanwhile, the results after the ambient temperature changed to normal were the same as the experiments conducted using the 1100 $\mu$m-thick glass plate.

To be more specific, for the touch panel with the heated PET film adhered via the ordinary adhesive, its operability was satisfactory only when the ambient temperature changed from 40° C. or −20° C. to normal (see table 5). However, for the touch panel with the heated PET film adhered via the stress relieving adhesive, its operability was satisfactory except when the ambient temperature changed from 70° C. to normal (see table 6). For the touch panel with the unheated PET film adhered via the stress relieving adhesive, its operability was satisfactory in all atmospheric conditions in case ② (see table 7). These experimental results indicate that whether the base sheet member 130 is a very thin glass plate of 700 $\mu$m or a thicker glass plate of 1100 $\mu$m, the operability can be substantially improved by adhering the unheated PET film onto the polarizing plate 102 using the stress relieving adhesive.

Here, before adhering the unheated PET film to the polarizing plate 102 as the bulge-resistant film 101 with the stress relieving adhesive, it is preferable to apply a surface treatment to the adhered surface of the unheated PET film.

In general, a PET film and an adhesive made of a stress relieving material do not have good adhesion, and might come off from each other under sudden temperature changes (especially in high temperatures). Therefore, it is desirable to apply a surface treatment to at least the adhered surface of the PET film to strengthen the adhesion with the adhesive.

As the surface treatment, a well-known treatment such as corona treatment or ozone ultraviolet irradiation treatment may be applied, but these treatments are difficult in establishing stable work conditions in their treatment processes. For reliability and manufacturability, it is preferable to form a hard coat layer on the adhered surface of the PET film using a material that has strong adhesion with the stress relieving adhesive. This can be done by coating the surface of the PET film with such a material.

The hard coating material may be ultraviolet cure unsaturated polyester, unsaturated acrylic resin, unsaturated polyurethane, polyamide, or the like. The coating may be easily done according to a well known roll coating technique that applies the hard coating material dissolved in a predetermined organic solvent to the surface of the PET film using a roller.

Figure 11:
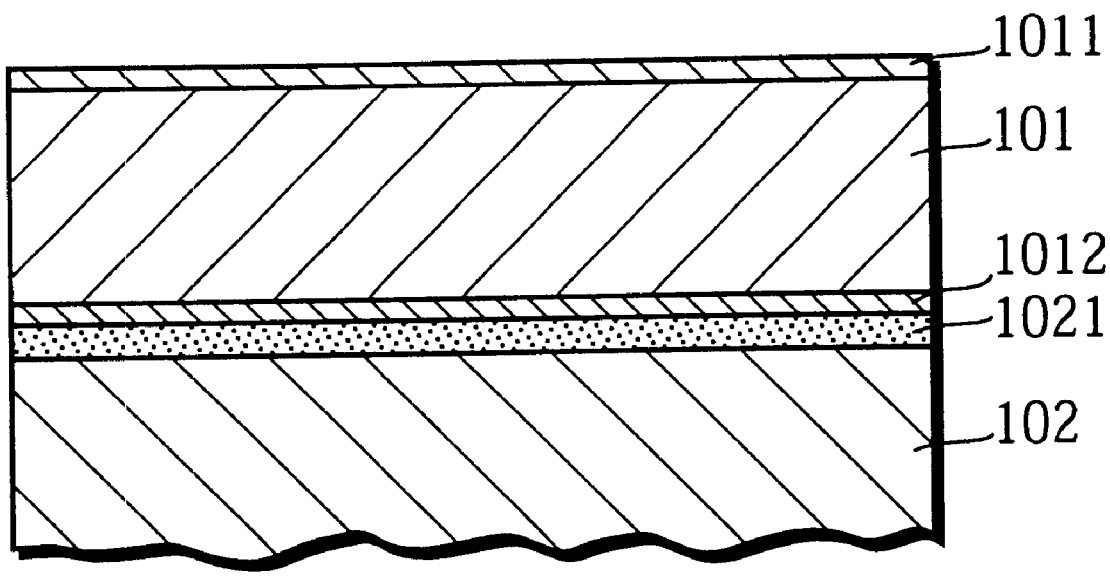
FIG. 11 is an expanded sectional view showing the contact area of the unheated PET film and the polarizing plate in the touch panel.

FIG. 11 is an expanded sectional view showing part of the top sheet member 110 in which the bulge-resistant film 101 (unheated PET film) has been coated with the hard coating material. Reference numeral 1021 designates the stress relieving adhesive layer between the bulge-resistant film 101 and the polarizing plate 102.

In the FIGURE, both surfaces of the bulge-resistant film 101 are covered with the hard coatings, so that hard coat layers 1011 and 1012 each having a thickness of 5 um are present. Since these hard coat layers not only realize strong adherence with the stress relieving adhesive but also have excellent durability, the hard coat layer 1011 serves to increase resistance to abrasion caused by pen input.

In each of the experiments shown in tables 3, 4, 6, and 7, the bulge-resistant film 101 was hard-coated on both surfaces thereof, before being adhered to the polarizing plate 102 via the stress relieving adhesive. As a result, no exfoliation was found between the bulge-resistant film 101 and the polarizing plate 102 even after 300 hours of exposure to high temperature conditions.

Modifications

Although the present invention has been described based on the above embodiment, the invention should not be limited to such. For instance, the following modifications are possible.

Figure 12:
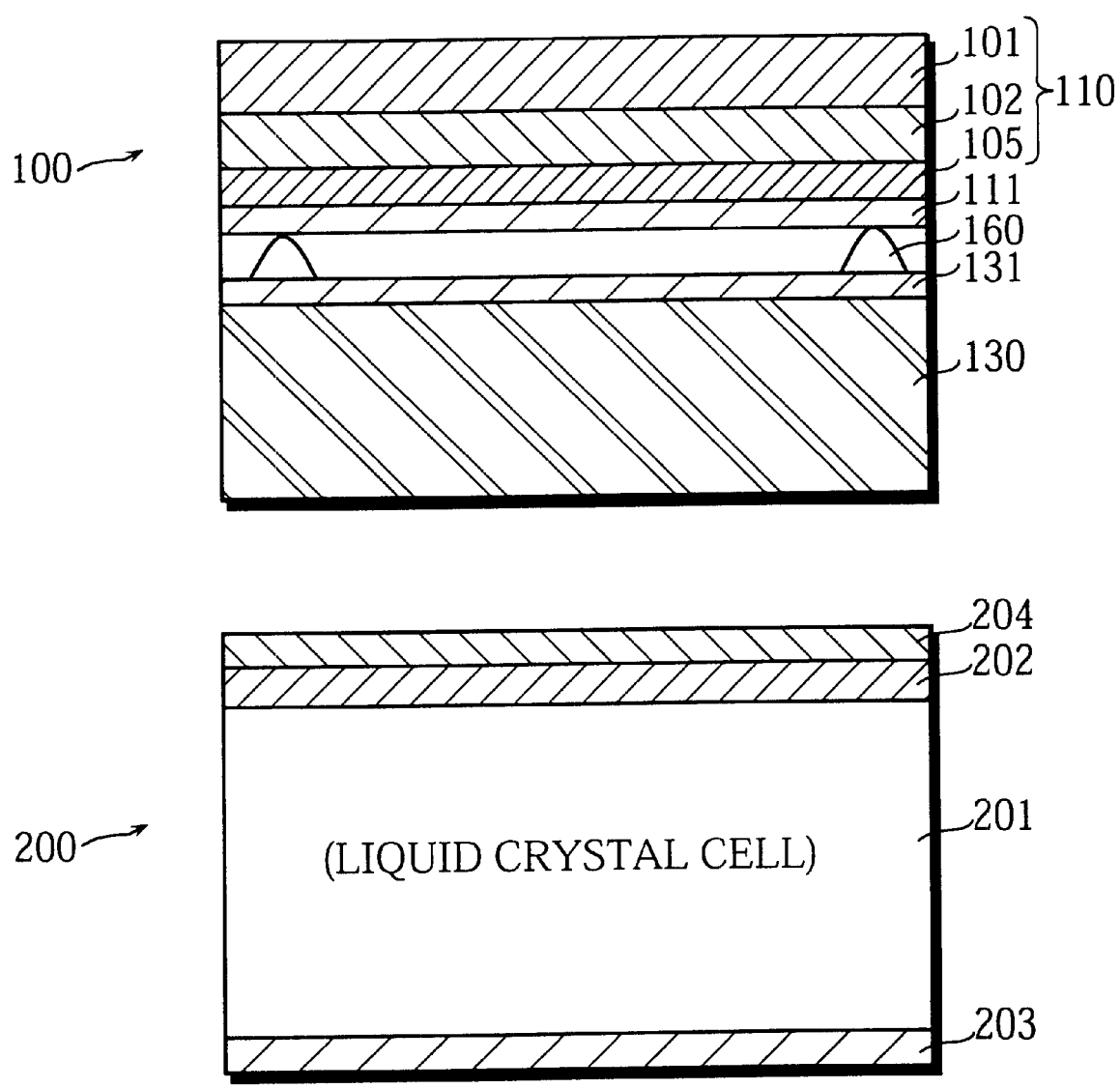
FIG. 12 is a partly enlarged sectional view showing the laminated structure of a variant of the touch panel.

(1) In the above embodiment, the quarter wavelength plate 103, the polarizing plate 102, and the bulge-resistant film 101 have been laminated on the light isotropic film 104 as the base in the top sheet member 110, and the resistive membrane 111 has been formed underneath the light isotropic film 104 by sputtering, as shown in FIG. 3. However, the light isotropic film 104 may be omitted so that the resistive membrane 111 is formed underneath a quarter wavelength plate 105 (80 μm in thickness) as the base by sputtering, as shown in FIG. 12.

The quarter wavelength plate 105 may be made of PC (polycarbonate) as in the above embodiment, or may be made of polyarylate, polysulfone, PVA, norbornene resin, olefin resin, or the like. Alternatively, the ARTON film used for the light isotropic film 104 may be drawn in one direction so as to be rendered double refractive, and used as the quarter wavelength plate 105.

The ARTON film has excellent transparency, surface hardness, and heat resistance as noted above, and facilitates the formation of the resistive membrane by sputtering.

Such an omission of one structural member from the top sheet member 110 benefits both cost reduction and weight reduction (reduction of about 5 g for a 12.1-inch touch panel). Also, since the top sheet member 110 becomes thinner, the touch panel 100 can operate with smaller operating weights, which further benefits the operability of the touch panel 100.

(2) In the above embodiment, linearly polarized light has been converted into circularly polarized light, to ensure visibility and resistance to glare (such a structure is hereafter referred to as "circularly polarizing structure"). However, a certain level of visibility and glare resistance can be achieved even if the touch panel 100 does not have the circularly polarizing structure, as long as it is equipped with the polarizing plate 102.

Figure 13:
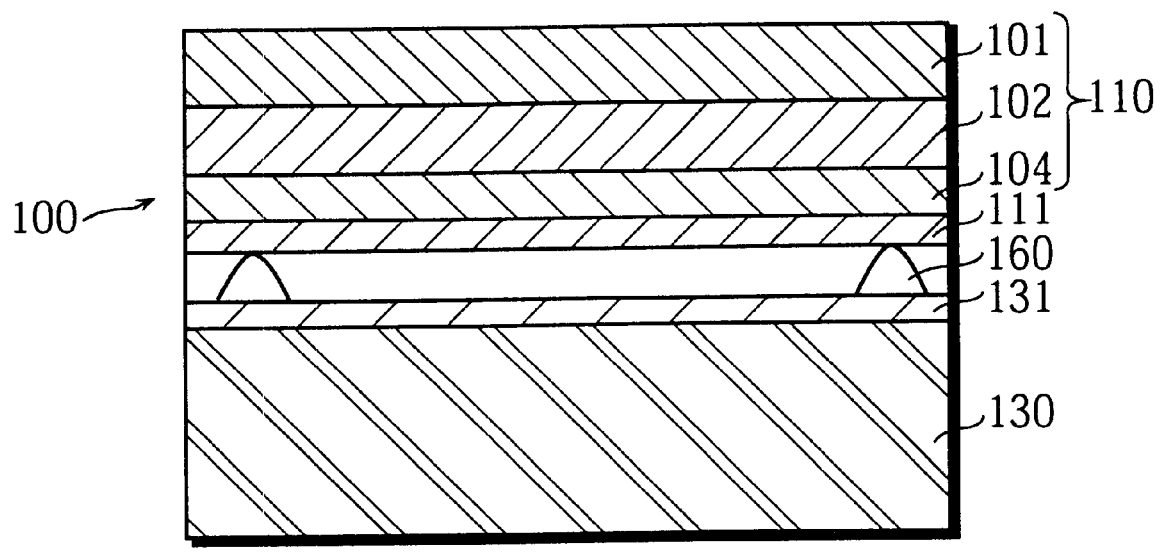
FIG. 13 is a partly enlarged sectional view showing the laminated structure of another variant of the touch panel.
Figure 13:
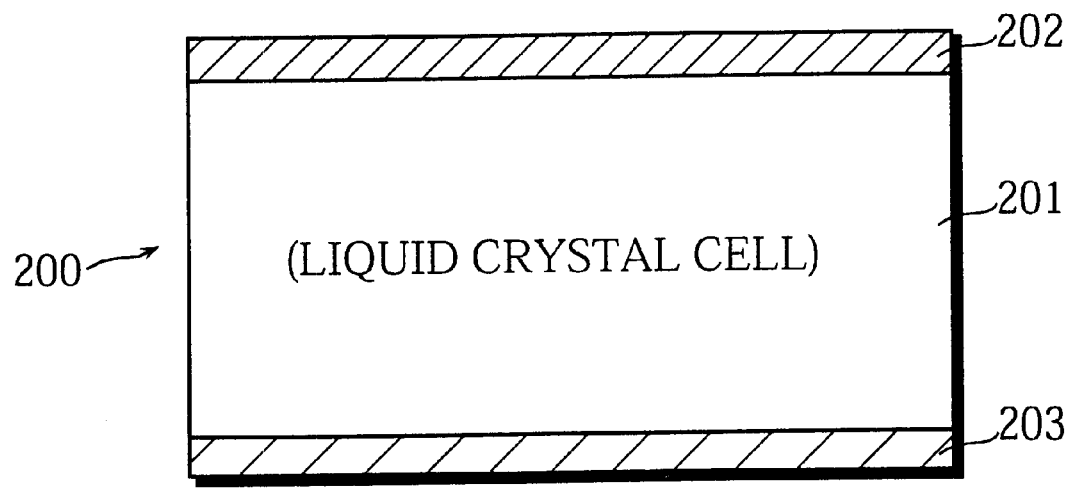

FIG. 13 is a partly enlarged sectional view showing the laminated structure of the touch panel 100 that does not have the circularly polarizing structure. As with FIG. 3, the laminated structure of the LCD panel 200 is also illustrated.

The top sheet member 110 is made by laminating the bulge-resistant film 101, the polarizing plate 102, and the light isotropic film 104 through the use of an adhesive (not shown). The resistive membrane 111 is formed underneath the bottommost light isotropic film 104. The base sheet member 130 is opposed to the top sheet member 110 with the dot spacers 160 being interposed therebetween, and the resistive membrane 131 is formed on the opposed surface of the base sheet member 130. This structure differs with the circularly polarizing structure in FIG. 3 in that the quarter wavelength plate 103 has been omitted.

Also, the quarter wavelength plate 204 has been omitted from the LCD panel 200 underneath the touch panel 100 in FIG. 13.

In this structure, the polarizing plate 102 in the touch panel 100 is set so as to have its polarizing axis parallel to that of the polarizing plate 202 in the LCD panel 200. This being so, light from the backlight source, having passed through the polarizing plate 202, can pass through the polarizing plate 102 as it is. Thus, the amount of light from the backlight source hardly decreases, with it being possible to ensure sufficient visibility.

Meanwhile, the amount of extraneous light incident through the bulge resistant film 101 decreases by approximately ½ at the polarizing plate 102, as the polarizing plate 102 allows only light whose polarizing plane is parallel to its polarizing axis to pass through. As a result, glare can be reduced to a tolerable level, though to a lesser extent than the touch panel 100 of the circularly polarizing structure.

(3) To further improve glare resistance and visibility, the following techniques may be employed in the above embodiment.

(a) Apply a well known anti-glare treatment to the upper surface of the bulge-resistant film 101 (or the upper surface of the hard coat layer 1011 if the bulge-resistant film 101 has been hard-coated on its upper surface for better durability) (AG finish).

(b) Coat the upper surface of the bulge-resistant film 101 with multiple thin layers of differing refractive indices, to attain antireflection (AR finish). The formation of the multiple thin layers and its antireflective effect are discussed in detail in Japanese Laid-Open Patent Application No. H3-173009.

(c) Coat the top surface of the top sheet member 110 with an organofluorine compound or an organosilicon compound, to attain soil resistance (soil resistant finish). If part of the surface of the touch panel 100 gets greasy when touched with a finger, that part becomes reflective and visibility decreases. However, the soil resistant finish keeps the surface from getting soiled by the touch of a finger, which benefits glare resistance and visibility.

These techniques (a) to (c) are more effective when used in combination. In combined use, the AG finish and the AR finish must be given in this order, and the soil resistant finish must be performed on the top surface of the touch panel 100.

(4) Though the quarter wavelength plate 103 has been made by drawing a resin film such as a PC film in one direction in the above embodiment, the resin film may be further drawn in the thickness direction so that it becomes a retardation plate oriented in the thickness direction. As a result, the dependence of the retardation of the quarter wavelength plate 103 on angle is reduced, with it being possible to widen the viewing angle of the touch panel 100.

(5) Though the stress relieving adhesive has been used to bond the bulge-resistant film 101 and the polarizing plate 102 in the above embodiment, the stress relieving adhesive may also be used to bond two structural members that have a certain difference in thermal linear expansion coefficient (e.g. a polarizing plate and a quarter wavelength plate).

(6) The bulge-resistant film 101 with a higher thermal contraction rate than that of the polarizing plate 102 has been used in the above embodiment. However, unless the thermal contraction rate of the bulge-resistant film 101 is below that of the polarizing plate 102, no slack will appear in the bulge-resistant film 101 when the ambient temperature drops to normal. Therefore, the bulge of the touch panel 100 can be suppressed even when the thermal contraction rate of the bulge-resistant film 101 is equal to that of the polarizing plate 102.

(7) In the above embodiment, an unheated PET film has been used as the bulge-resistant film 101 as it has a lower thermal linear expansion coefficient and a higher thermal contraction rate than the polarizing plate 102. However, a film of other material may instead be used as long as it bears these properties, although the use of the PET film has the following advantages.

The TAC films used in the polarizing plate 102 are hygroscopic and have an extremely high hygroscopic linear expansion coefficient (i.e. linear expansion coefficient due to moisture absorption) of $4 \times 10^{-5}$ cm/cm/% to $7 \times 10^{-5}$ cm/cm/%. Accordingly, the expansion of the polarizing plate 102 tends to double if the temperature and the humidity both rise. On the other hand, the PET film has little hygroscopicity, so that covering the upper surface of the polarizing plate 102 with the PET film has the effect of keeping the polarizing plate 102 from contact with outside air. In so doing, the touch panel 100 will not be adversely affected by a change in outside humidity. Here, even if part of the polarizing plate 102 which is not covered with the PET film (e.g. an end face of the polarizing plate 102) absorbs water from the air and causes hygroscopic linear expansion of the polarizing plate 102 that would induce an outward bulge, the forces opposing such a bulge will be exerted on the surface of the polarizing plate 102 from the PET film, as the PET film has a lower hygroscopic linear expansion coefficient than the polarizing plate 102. As a result, the bulge of the touch panel 100 can be effectively suppressed.

Therefore, if the main material of the polarizing plate 102 has a high hygroscopic linear expansion coefficient like the TAC films, it is preferable to use a resin film with a lower hygroscopic linear expansion coefficient as the bulge-resistant film 101. As a resin film that bears all these properties (i.e. a resin film having a lower thermal linear expansion coefficient, a higher thermal contraction rate, and a lower hygroscopic linear expansion coefficient than the polarizing plate 102), a film of polyethylene naphthalate (PEN) that is a polyester resin as with PET may be utilized without heat treatment, instead of the unheated PET film.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A resistive-membrane touch panel comprising:

a first sheet member having a first resistive membrane on a main surface thereof;

a second sheet member that is flexible and has a second resistive membrane on a main surface thereof, the second sheet member being opposed to the first sheet member with a spacer interposed in between in such a manner that the second resistive membrane and the first resistive membrane face each other with a certain spacing therebetween; and a third sheet member that is laminated on an outer main surface of the second sheet member and has a lower thermal linear expansion coefficient than the second sheet ark member, wherein the second sheet member has a polarizing property, and the third sheet member has a thermal contraction rate no lower than a thermal contraction rate of the second sheet member.

2. The resistive-membrane touch panel of claim 1, wherein the third sheet member is adhered to the outer main surface of the second sheet member using an adhesive that has a stress relieving property.

3. The resistive-membrane touch panel of claim 2, wherein a viscoelasticity of the adhesive is in a range of $1.0 \times 10^5$ dyn/cm$^2$ to $1.2 \times 10^6$ dyn/cm$^2$ inclusive.

4. The resistive-membrane touch panel of claim 2, wherein the third sheet member is coated with a hard coating material on an inner main surface thereof which is adhered to the outer main surface of the second sheet member.

5. The resistive-membrane touch panel of claim 1, wherein the third sheet member has a lower hygroscopic linear expansion coefficient than the second sheet member.

6. The resistive-membrane touch panel of claim 1, wherein the second sheet member is made by laminating at least two sheet members including a polarizer.

7. The resistive-membrane touch panel of claim 6, wherein a first quarter wavelength plate is placed outside the first sheet member so as to be approximately parallel to the first sheet member, and the sheet members laminated in the second sheet member include a second quarter wavelength plate that is positioned nearer to an inner main surface of the second sheet member than the polarizer.

8. The resistive-membrane touch panel of claim 7, wherein an optical axis of the first quarter wavelength plate forms an angle of 45° with a polarizing axis of the polarizer in a first direction, and an optical axis of the second quarter wavelength plate forms an angle of 45° with the polarizing axis of the polarizer in a second direction that is opposite to the first direction.

9. The resistive-membrane touch panel of claim 7, wherein the second resistive membrane is provided on an inner main surface of the second quarter wavelength plate.

10. The resistive-membrane touch panel of claim 9, wherein the second quarter wavelength plate is a film made of a resin material selected from the group consisting of polycarbonate, polyarylate, polysulfone, polyvinyl alcohol, norbornene resin, and olefin resin.

11. The resistive-membrane touch panel of claim 6, wherein among the sheet members laminated in the second sheet member, at least one pair of adjacent sheet members with different thermal linear expansion coefficients are adhered to each other using an adhesive that has a stress relieving property.

12. The resistive-membrane touch panel of claim 6, wherein the polarizer is made by sandwiching a polyvinyl alcohol film having a polarizing property between triacetylacetate films, and the third sheet member is made of a material that has a lower hygroscopic linear expansion coefficient than the triacetylacetate films.

13. The resistive-membrane touch panel of claim 1, wherein the third sheet member is a polyethylene terephthalate film which is not heat-treated.

14. The resistive-membrane touch panel of claim 1, wherein the third sheet member is a polyethylene naphthalate film which is not heat-treated.

15. The resistive-membrane touch panel of claim 1, wherein the third sheet member is anti-glare treated on an outer main surface thereof.

16. The resistive-membrane touch panel of claim 1, wherein the third sheet member is coated on an outer main surface thereof with multiple thin layers of differing refractive indices.

17. The resistive-membrane touch panel of claim 1, wherein the third sheet member is coated on an outer main surface thereof with a coating material that is one of an organofluorine compound and an organosilicon compound.

18. A resistive-membrane touch panel comprising:

a first sheet member having a first resistive membrane on a main surface thereof;

a second sheet member that is flexible and has a second resistive membrane on a main surface thereof, the second sheet member being opposed to the first sheet member with a spacer interposed in between in such a manner that the second resistive membrane and the first resistive membrane face each other with a certain spacing therebetween; and a third sheet member that is laminated on an outer main surface of the second sheet member with an adhesive having a viscoelasticity in a range of $1.0\times10^5$ dyn/cm$^2$ to $1.2\times10^6$ dyn/cm$^2$, wherein the second sheet member has a polarizing property, and the third sheet member has a thermal contraction rate no lower than a thermal contraction rate of the second sheet member.

19. A resistive-membrane touch panel comprising:

a first sheet member having a first resistive membrane on a main surface thereof;

a second sheet member that is flexible and has a second resistive membrane on a main surface thereof, the second sheet member being opposed to the first sheet member with a spacer interposed in between in such a manner that the second resistive membrane and the first resistive membrane face each other with a certain spacing therebetween; and a third sheet member that is laminated on an outer main surface of the second sheet member, the third sheet member is coated with a hard coating material on an inner main surface thereof which is adhered to the outer main surface of the second sheet member using an adhesive that has a stress relieving property, wherein the second sheet member has a polarizing property, and the third sheet member has a thermal contraction rate no lower than a thermal contraction rate of the second sheet member.

* * * * *